Aug. 18, 1925.
V. H. WENZL
HAND PROPELLED SLED
Filed April 11, 1924      3 Sheets-Sheet 1
1,549,941
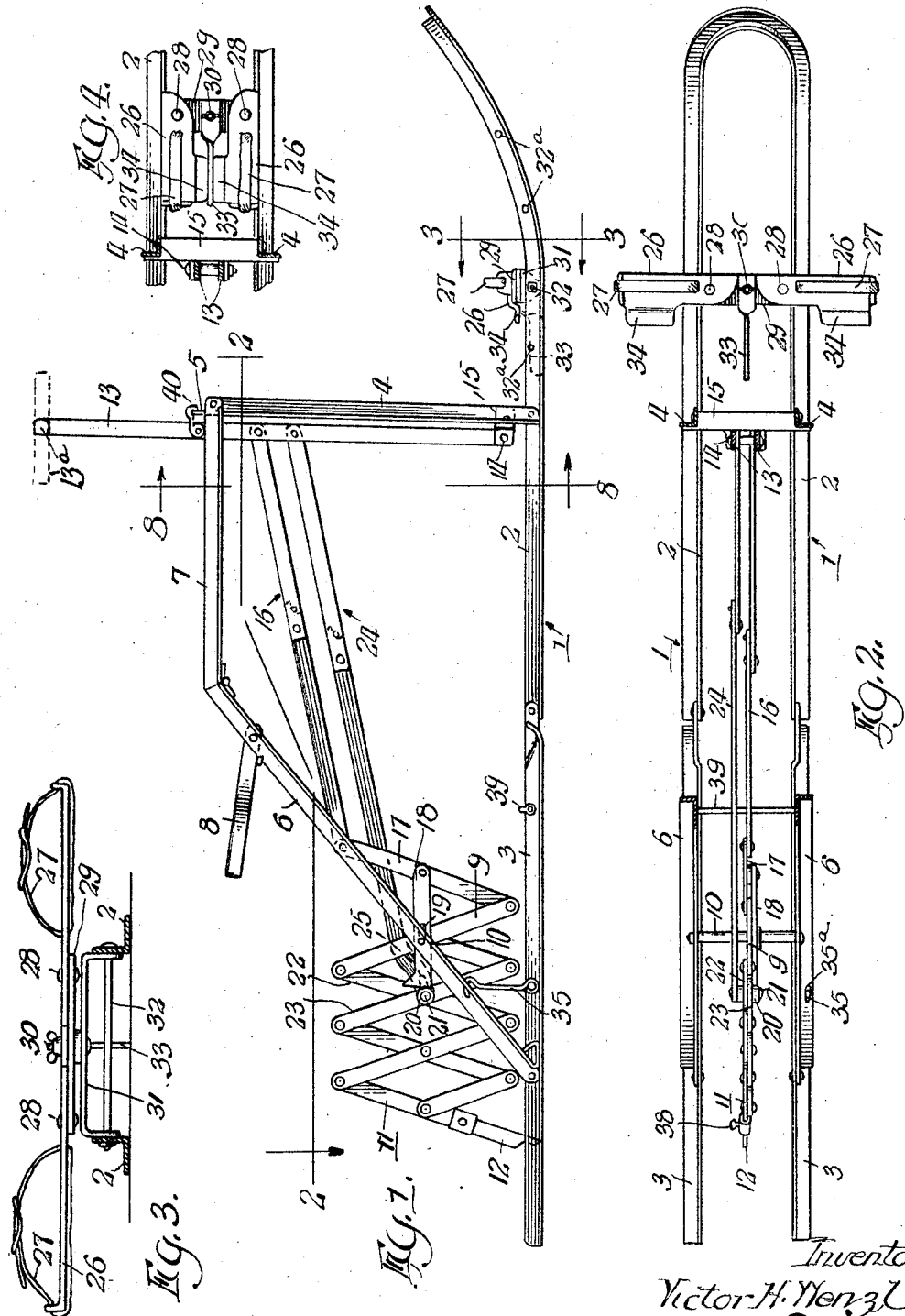
Inventor
Victor H. Wenzl Aug. 18, 1925.
V. H. WENZL
1,549,941
HAND PROPELLED SLED
Filed April 11, 1924     3 Sheets-Sheet 2
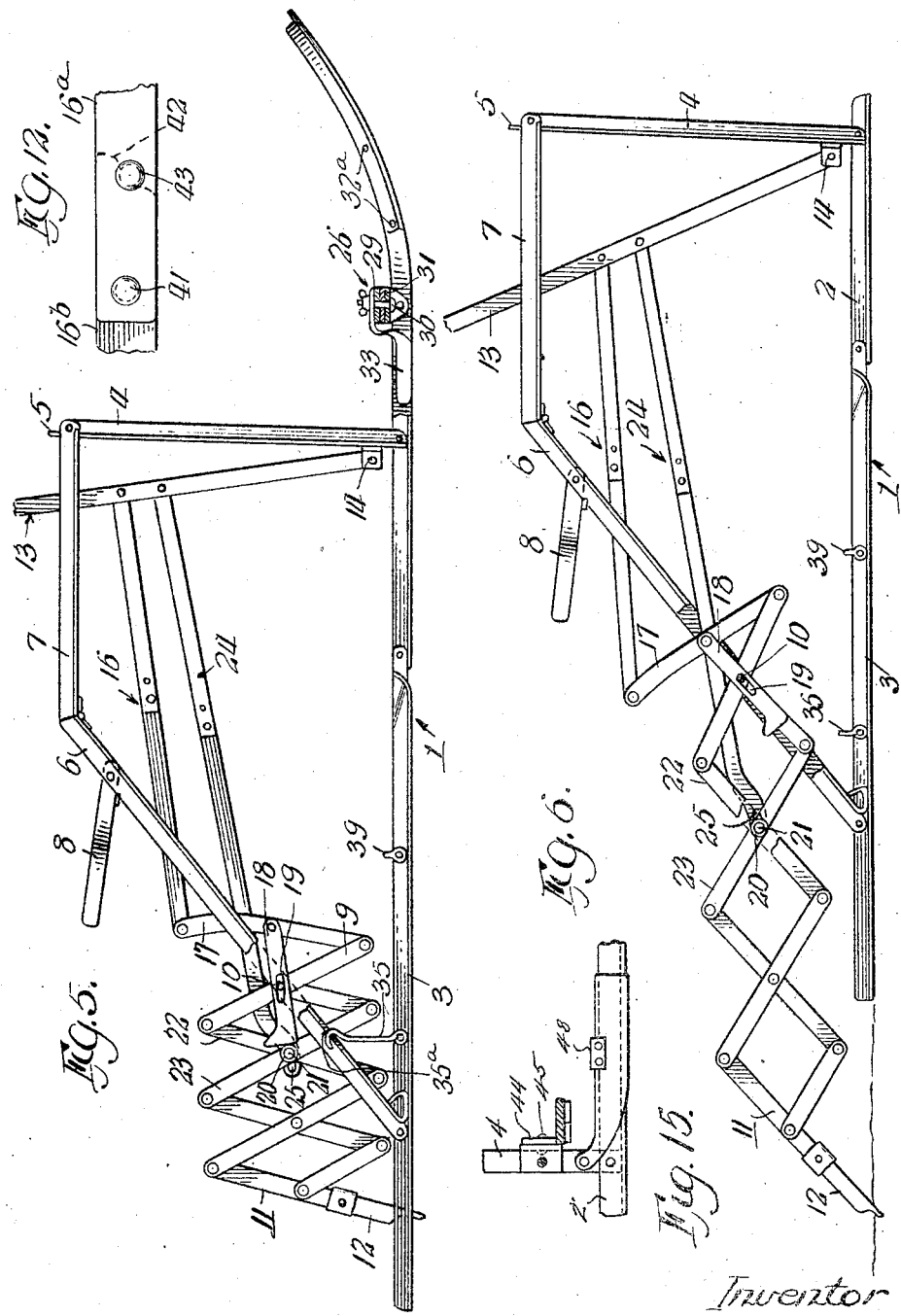
Inventor
Victor H. Wenzl
by Eugene Ewan Atty.

Aug. 18, 1925. 1,549,941
V. H. WENZL
HAND PROPELLED SLED
Filed April 11, 1924   3 Sheets-Sheet 3
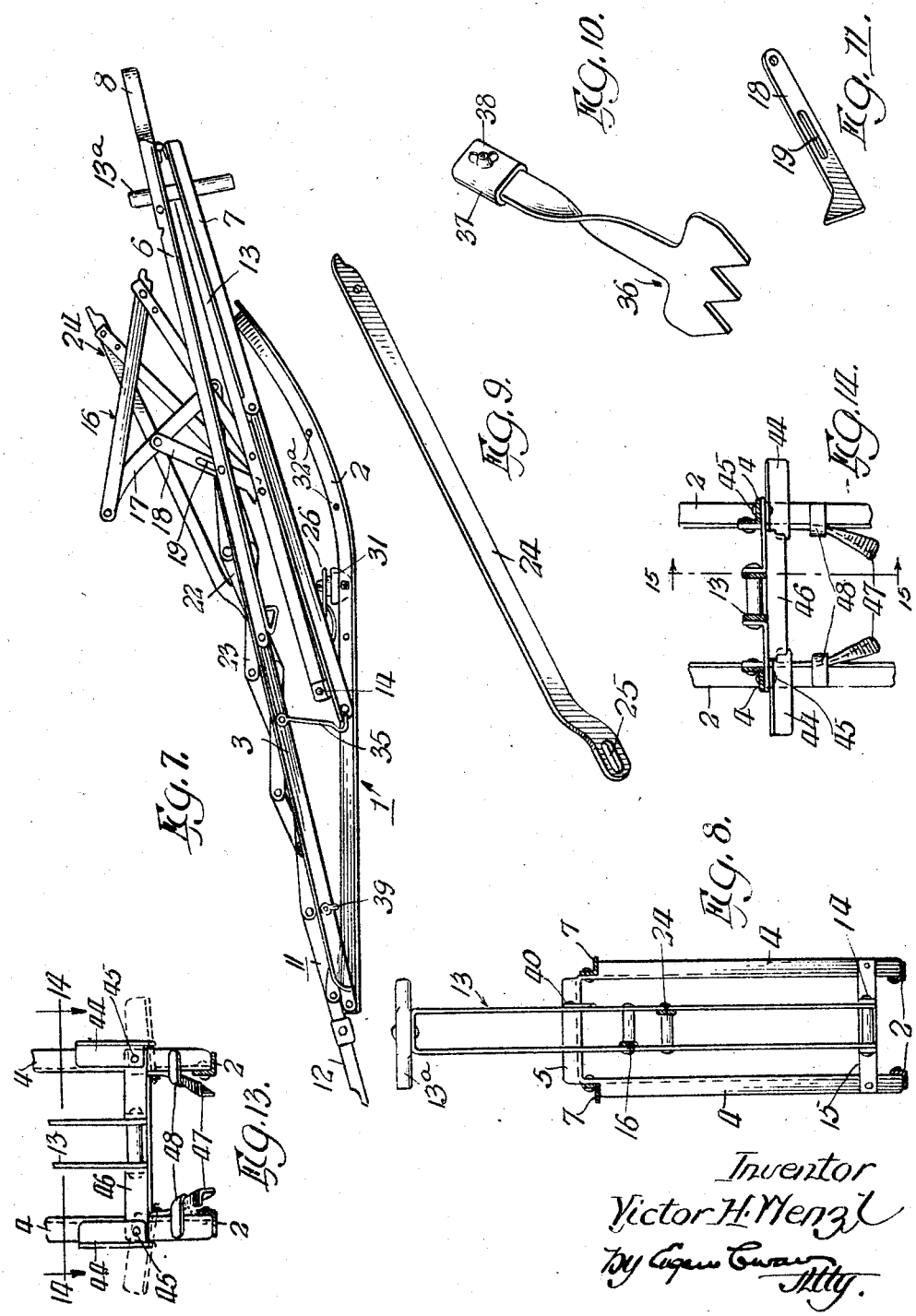

Patented Aug. 18, 1925.

1,549,941

UNITED STATES PATENT OFFICE.

VICTOR H. WENZL, OF BUCHANAN, MICHIGAN.

HAND-PROPELLED SLED.

Application filed April 11, 1924. Serial No. 705,799.

*To all whom it may concern:*

Be it known that I, VICTOR H. WENZL, a citizen of the United States, residing at Buchanan, in the county of Berrien and State of Michigan, have invented new and useful Improvements in Hand-Propelled Sleds, of which the following is a specification.

This invention relates to foldable or collapsible sleds with propulsion mechanism, and consists in the matters hereinafter described and claimed.

In the accompanying drawings—

Fig. 1 is a side view of a sled constructed in accordance with my invention and set up ready for use;

Fig. 2 is a horizontal sectional view taken on the indirect line 2—2 of Fig. 1;

Fig. 3 is an enlarged vertical sectional view taken on line 3—3 of Fig. 1 at the foot rests;

Fig. 4 is a top plan view of the foot rests in folded position;

Figs. 5 and 6 are views illustrating the action of the propulsion mechanism;

Fig. 7 is a view showing the sled folded or collapsed into compact form with its parts locked in that shape;

Fig. 8 is a vertical sectional view taken on line 8—8 of Fig. 1;

Figs. 9, 10, 11, and 12 illustrate various details of structure to be hereinafter more fully described;

Figs. 13 and 14 are sectional views showing a modified form of foot rests and steering apparatus, Fig. 14 being a horizontal sectional view on line 14—14 of Fig. 13; and Fig. 15 is a vertical sectional view on line 15—15 of Fig. 14.

The sled of my invention comprises two substantially parallel, closely spaced runners 1, 1 of the same length and with their front ends curved upward, as shown in Fig. 1. Said runners are divided into front and rear sections 2, 3, hinged or pivoted together at their meeting ends, as shown. The runners 1, 1 are preferably made from steel or like angle bars with the front sections 2, 2 formed from a single length of bar folded transversely on itself with the looped end at the front of the sled.

Mounted on the runners 1, 1 is a rider's support, comprising a frame made up of a pair of forward members 4, 4, upright when the sled is set up for use, as shown in Fig. 1, and hinged at their lower ends to the front runner sections 2, 2, as shown. The members 4, 4 are connected together at their upper ends by a cross-bar 5 (See Fig. 8). The rear part of this support consists of a pair of rear members 6, 6 and side members 7, 7, the latter extending between the front and rear members 4 and 6 and hinged to both. The lower ends of the rear members 6, 6 are hinged to the rear runner sections 3, 3, as shown. When the sled is set up for use, the rear members 6, 6 are inclined upwardly and forwardly and carry a hinged seat 8 to support the rider when straddling the support.

The propulsion mechanism comprises an extensible device, preferably in the form of lazy tongs, arranged between the rear members 6, 6 with its foremost link 9 fulcrumed on said rear members 6, 6 by a cross-bolt 10, as shown in Figs. 1 and 2. The rearmost link 11 carries at its lower or free end a spur 12 to be forced into the ice or snow between the runners in propelling the sled forward.

Arranged between the side members 7 in front of the lazy tongs is an operating lever 13 extending above the frame and there provided with a cross-handle 13ª. The lower end of the lever 13 is fulcrumed at 14 to a cross-piece 15 carried by the front members 4, 4, as shown in Figs. 1 and 8. Pivoted to the lever 13 below the side members 7 is a connecting bar 16 made of front and rear sections hinged together at their meeting ends in such manner that said sections may break in one direction on folding or collapsing the sled but held in alignment when used to operate the lazy tongs (see Figs. 7 and 12). The lower end of the front link 9 of the lazy tongs is connected by an actuating link 17 with the rear end of the bar 16. By the construction described, when the tongs are collapsed, as in starting position (full lines in Fig. 1), a rearward thrust on the bar 16 through the lever 13 transmits force directly downward on the spur 12 to force it immediately into engagement with the snow or ice and maintain that engagement during the entire propulsion stroke so that at no time during that stroke is an opportunity afforded for the spur to be lifted or pried from its firm engagement with the underlying surface. This is especially advantageous when first starting the sled in motion as the full benefit of the propulsion stroke throughout its entire length is needed to give momentum. By applying this force at the lower end of the front link 9 and taking it off at the lower end of the rear link 11, the spur 12 will be forced down into the ice or snow regardless of the irregularity of the underlying surface. Thus the spur will be forced into a depression or hole as well as a raised surface and take firm hold for propulsion purposes.

An arm 18 is pivoted to the link 17 between the ends of the latter and extends rearward beyond the fulcrum bolt 10, having an elongated slot 19 therein for the bolt to pass through. At its rear end said arm 18 engages against a roller 20 carried by the connecting stud 21 for the intermediate links 22 and 23 of the lazy tongs. These links 22, 23 are to the rear of the front link 9, and the upper end of the latter is pivoted to the upper end of the link 22, as shown in the drawings.

In addition to forcing the spur 12 downward at the beginning of the propulsion stroke, the arm 18 pushes directly rearward on the roller 20 to start the distention of the lazy tongs to propel the sled forward. This contact between the arm 18 and roller 20 remains until the arm has been moved rearward far enough to cause about two-thirds of its elongated slot 19 to pass the bolt 10, whereupon continued distention of the lazy tongs is carried out by the bars 24 and 16.

Said bar 24 is below the one 16 and is made in front and rear sections hinged together at their meeting ends like bar 16, and is pivoted at its front end to the hand lever 13. The rear end of this bar 24 is offset downward and is there provided with an elongated slot 25 to engage the cross-stud 21 on that side of the lazy tongs opposite the arm 18, as shown in Figs. 5 and 6. The length of the bar 24 and arrangement of the slot 25 are such that the forward end of the slot 25 does not come into contact with the cross-stud 21 until two-thirds of the slot 19 has passed the bolt 10. Then the bar 24 continues the rear push on the lazy tongs until the forward end of slot 19 contacts with the bolt 10, whereupon the bar 16 through link 17 completes the full distention of the lazy tongs and carries stud 21 to the rear end of slot 25 so that the bar 24 will collapse the lazy tongs on returning it to starting position. During the collapsing movement, bar 16 by acting on the lazy tongs through link 17 tends to raise the spur 12 from contact with the ice or snow. In this movement, the arm 18 is swung from inclined position of Fig. 6 to the more or less horizontal position of Figs. 1 and 5, in which position the parts are again ready for the propulsion stroke. During the entire propulsion stroke, the bar 16 aids in distending the lazy tongs by reason of the fact that they fulcrum on the bolt 10.

In front of the frame members 4, 4 are foot rests 26, 26 made from metal plates having straps 27 forming loops for the feet of the rider. The rests 26 extend outward over the runner sections 2, 2 as shown in Figs. 2 and 3, and by rivets 28, 28 are pivoted to an underlying plate 29. This plate 29 is pivoted by a bolt 30 to a cross-member 31 connected by a bolt 32 with the runner sections 2, 2 as shown in Fig. 3. Between the runner sections 2, 2 at the foot rests is a rudder 33 secured to the plate 29 by the bolt 30 between the inner ends of the foot rests 26. The inner ends of said rests are rounded and when extending outward over the runner sections 2, 2 engage the intermediate position of the rudder 33 to swing it from side to side as the rests 26 are turned about their rivets 28 by the feet of the rider in steering the sled. The cross-bolt 32 forms a pivotal connection with the runner sections 2, 2 and permits rocking the rests 26 down for placing pressure on the rudder 33 for steering purposes. To adjust the foot rests toward and from the rider's support to accommodate them to the rider, I provide a plurality of spaced holes $32^a$ in the runner sections 2, 2 for the bolt 32.

To fold up the sled, the seat supports 6, 6 are first swung upward and over the front runner sections 2, 2, thereby causing the frame to collapse with the parts assuming the folded position shown in Fig. 7. One of the rear runner sections 3 carries a hook 35, which when the sled is collapsed as shown in Fig. 7 may be hooked under the adjacent end of one of the front sections 4 to lock the parts in collapsed form. When the sled is set up for use, the hook 35 engages one of the seat supports 6 through a hole $35^a$ therein to hold the frame upright.

Fig. 10 shows a perspective view of a three-pointed spur 36, which may be attached to the free end of the rear link 11 of the lazy tongs, in place of a single or double pointed spur, as may be required by the condition of the ice or snow at the time of use of the sled. If the snow is soft a multiple pointed spur will be required, whereas if the ice is hard a single pointed spur is all that is necessary. For interchangeable use of these different types of spurs, a sleeve 37 is used to couple the lower end of the link 11 and the desired spur together, a suitable bolt 38 being employed to provide a rigid but removable connection.

The handle $13^a$ on the upper end of the actuating lever 13 is pivoted thereto so that the handle may be turned to pass through the folded parts of the sled when collapsed, as shown in Fig. 7. Suitable means may be employed to hold the handle $13^a$ from accidental turning when in use. The parts of the framework forming the rider's support are also made of metal angle bars and, as shown in Fig. 8, the lever 13 is made of a single length of metal bar, folded on itself to provide two spaced apart, parallel sections, integrally connected at their outer ends by the folded part in the bar. The bars 16 and 24 are connected with the respective sections of said lever, as shown. A cross-member 39 connects the rear runner sections 3, 3 together adjacent their front ends for strengthening purposes. A hook 40 on the lever 13 may be hooked over the cross-member 5 for holding the lever in its upright position when the sled is set up but not in use, and also for coasting.

The hinged connection between the front and rear sections 16ª, 16ᵇ of bar 16 is detailed in Fig. 12. As there illustrated, said sections are connected by a rivet 41. The rear section 16ᵇ extends forward beyond said rivet and has a cut-away end forming a stop shoulder 42 for a pin 43 carried by the other section 16ª. This pin 43 is below the center of the pivot 41 so that the bar will not break up when a rear force is exerted thereon during the propulsion stroke. The bar 24 is made in the same manner.

In Figs. 13 and 14, the foot rests 44, 44 are carried on the front members 4, 4 above the runner sections 2, 2. These rests are pivoted at 45 to said front members so that they may be swung upward and alongside said front members when the sled is collapsed, and thus be out of the way as shown in full lines in Fig. 13. The cross-piece 46 for the operating lever 13 has a horizontal base flange under which the flanged ends of the rests 44 strike when lowered to hold them in positions projecting outside of the sled when in use as shown in full lines in Fig. 14.

Figs. 13 to 15 also show another form of steering means particularly applicable for the rests 44. Two rudder members 47, 47 are employed, one pivoted to each front member 4, 4 on the inside and extending under and to the rear of the rests 44, 44, as shown in Fig. 15. Each rudder 47 has on its upper side a lug 48 projecting outward over the associated runner 2 and in position to be readily engaged by the heel of the foot on the rest for steering purposes.

With the propulsion mechanism of my invention, the sled may be easily started from a standstill, because the spur 12 is immediately forced into the underlying surface and remains so engaged during the entire propulsion stroke instead of being pried up from such surface to lose the effect of the stroke as with lazy tong devices as heretofore suggested or employed. To start the sled at dead weight is essential to a successful propulsion device, and with my invention the start is instantly made with a smooth and quick action so that speed is rapidly gained. The propulsion strokes are without jerk or jar whether full or only part strokes, thus making the sled easy to ride and handle. Moreover, distending the lazy tongs by the action of devices operating on said tongs on opposite sides of its fulcrum and one in advance of the other, the tongs may be distended to a greater length than heretofore, thus giving a greater push to the sled for each stroke with less movement of the operating lever.

The details of structure shown and described may be variously changed and modified without departing from the spirit and scope of my invention.

I claim as my invention:

1. A sled, comprising runners, a rider support thereon, and propulsion mechanism including lazy tongs fulcrumed on said support and having a spur, said propulsion mechanism including means acting on the lazy tongs in advance of its fulcrum for imparting a downward thrust on the spur during the distention of said tongs, said propulsion mechanism also including distending devices acting on the tongs on the rear side of its fulcrum.

2. A sled, comprising runners, a rider support thereon, and a propulsion mechanism including lazy tongs fulcrumed on said support and having a spur, said propulsion mechanism including means for imparting a downward thrust on the spur during the distension of said tongs, and also devices acting on the lazy tongs one in advance of the other on the rear side of its fulcrum to distend said tongs, one of said devices receiving its thrust from the front side of said fulcrum and through the means for imparting a downward thrust on the spur.

3. A sled, comprising runners, a rider support thereon, a propulsion mechanism including lazy tongs fulcrumed on said support and having a spur, an operating lever in front of said tongs, a bar connected with said lever, an actuating link connecting the front link of the lazy tongs with said bar for imparting a downward thrust on the spur during the distention of the lazy tongs, an arm pivoted to the actuating link and engaging the lazy tongs on the rear side of its fulcrum for distending the tongs at the beginning of the propulsion stroke, and means actuated by said lever to continue the distention of the tongs.

4. A sled, comprising runners, a rider support thereon, and a propulsion mechanism including lazy tongs fulcrumed on said support and having a spur, an operating lever, two bars, one longer than the other and both connected with said lever, an actuating link connecting the shorter bar with the front link of the lazy tongs for imparting a downward thrust on the spur during the propulsion stroke, and an arm pivoted to the actuating link and having a slot engaging the fulcrum of the tongs, said arm being forced against a stud on the tongs to the rear of the fulcrum at the beginning of the propulsion stroke, the longer bar having an elongated slot engaging said stud to continue the distention of the tongs after said arm leaves the stud.

5. A sled, comprising laterally spaced runners, a rider support thereon, said support embracing an open collapsible framework including front and rear members, the latter carrying a seat, and a propulsion mechanism including lazy tongs fulcrumed on the rear members of said framework and having a spur to engage the surface of the ice or snow between the runners, said propulsion mechanism having an operating lever fulcrumed on the front members in front of the lazy tongs and connected therewith for collapsing and distending the same.

6. A sled, comprising a pair of laterally spaced runners, a rider support thereon, a propulsion mechanism carried by the sled and having an operating lever, foot rests on the runners in front of said support and being pivotally mounted for swinging from folded positions alongside the runners to positions extending outside of said runners and above the same, and a steering member between the runners and operated by said foot rests.

7. A sled, comprising laterally spaced runners, a rider support thereon, a propulsion mechanism carried by said support and including an operating lever, foot rests carried by the runners in front of said support, said rests being pivotally mounted to be swung from folded positions alongside the runners to positions extending over and outside of the same, a steering member between the runners and operated by said foot rests, and means whereby adjustment of said rests may be had toward and from said support.

8. A sled, comprising laterally spaced runners, a rider support thereon, a propulsion mechanism carried by said support and including an operating lever, a pair of foldable foot rests carried by the runners in front of said support and movable into positions extending across the runners and outside the same, and a steering member between the runners and operated by said foot rests, said rests having heel plates and rockably mounted on the runners so that a downward pressure may be exerted on said steering member.

9. A sled, comprising laterally spaced runners, each formed of front and rear sections hinged together at their meeting ends, the front sections being formed from a single bar folded on itself with the folded portion at the front end of the sled, a rider support on said runners, said support embracing a framework of members hinged together and to the front and rear sections of said runners so that the sled may be folded or collapsed into compact form with the rear sections of the runners above the front sections and the folded members of said framework between them, and a propulsion mechanism carried by said sled.

10. A sled, comprising a pair of laterally spaced runners, a rider support thereon, a propulsion mechanism carried by the sled and having an operating lever, foot rests on the sled and pivotally mounted to be swung into and out of positions extending across the runners, and a steering means on the sled and operated from said rests.

11. A sled, comprising laterally spaced runners, a rider support thereon, a propulsion mechanism carried by said support and including an operating lever, a plate carried by said runners, foot rests pivoted to said plate so as to be swung into and out of positions alongside said runners, and a steering member between said runners and having a part between the inner ends of said rests to be swung therewith for steering purposes.

12. A sled, comprising laterally spaced runners, a rider support thereon, a propulsion mechanism carried by said support and including an operating lever, a member extending across said runners and rockably carried thereby, a plate pivoted to said member, foot rests with loops pivoted to said plate, and a steering member between the runners and movable by said foot rests.

13. A foldable sled, comprising runners, a rider support thereon, and a propulsion mechanism embracing lazy tongs fulcrumed on said support, said propulsion mechanism including an operating lever and bars connecting the lever to said tongs for distending and collapsing the same, said bars consisting of hinged sections for folding with the sled, the hinged connections having stops off center to prevent accidental breaking when end thrusts are placed on the bars during distention of the tongs.

In testimony that I claim the foregoing as my invention, I affix my signature this 2nd day of April, 1924.

VICTOR H. WENZL.